US008267693B1

(12) United States Patent  (10) Patent No.: US 8,267,693 B1
Moss  (45) Date of Patent: Sep. 18, 2012

(54) PET THEME EDUCATIONAL BOARD GAME

(76) Inventor: Patricia McCormick Moss, Phoenix, AZ (US)

( * ) Notice: Subject to any disclaimer, the term of this patent is extended or adjusted under 35 U.S.C. 154(b) by 0 days.

(21) Appl. No.: 13/313,848

(22) Filed: Dec. 7, 2011

Related U.S. Application Data

(63) Continuation of application No. 12/267,892, filed on Nov. 10, 2008, now abandoned.

(51) Int. Cl.
*G09B 19/22* (2006.01)
(52) U.S. Cl. ........................................ 434/129
(58) Field of Classification Search .................. 434/128, 434/129, 219, 236, 237, 295; 273/236, 242, 273/243, 246, 248–252, 256, 287; D21/334, D21/350, 360, 361
See application file for complete search history.

(56) References Cited

U.S. PATENT DOCUMENTS

| | | | |
|---|---|---|---|
| D112,184 S | 11/1938 | Toti | |
| 3,656,757 A | 4/1972 | Carroll | |
| 3,834,709 A | 9/1974 | Lamb | |
| 3,897,064 A * | 7/1975 | Sonnabend | 273/249 |
| 4,078,803 A | 3/1978 | Te | |
| 4,257,610 A * | 3/1981 | Ptaszek et al. | 273/248 |
| 4,440,396 A | 4/1984 | Frudakis | |
| D300,121 S | 3/1989 | Lieffertz | |
| 4,824,117 A | 4/1989 | Russell | |
| 4,986,757 A | 1/1991 | Mueller | |
| 5,052,692 A | 10/1991 | Gustafson | |
| D339,611 S | 9/1993 | Horton | |
| 5,308,078 A * | 5/1994 | Hatter | 273/246 |
| 5,478,086 A | 12/1995 | Aylett | |
| 5,513,848 A | 5/1996 | Keener | |
| 5,639,242 A | 6/1997 | Wilson | |
| D390,885 S | 2/1998 | Molnar | |
| 5,860,652 A | 1/1999 | Ruff | |
| 5,897,115 A | 4/1999 | Sherry et al. | |
| 5,924,693 A | 7/1999 | Beaumier et al. | |
| 6,352,259 B1 | 3/2002 | Israel | |
| 6,871,853 B2 | 3/2005 | Bedford | |
| 7,234,699 B2 | 6/2007 | Putnam | |
| 7,350,782 B2 * | 4/2008 | Sumner et al. | 273/243 |
| 7,461,844 B1 * | 12/2008 | DeVor | 273/249 |
| 7,507,090 B2 | 3/2009 | Herman | |
| 2006/0012120 A1 | 1/2006 | Kash et al. | |

(Continued)

FOREIGN PATENT DOCUMENTS

GB    2382995    6/2003

OTHER PUBLICATIONS

Doggone Crazy! Board Game Information, available at http://www.doggonecrazy.ca/about%20doggone%20crazy.htm, last visited Aug. 24, 2011.
Dog Dash Online Video Game, available at http://www.flasharcade.com/action-games/dog-dash-game.html, last visited Aug. 24, 2011.
Fetch Trivia Board Game Information, available at http://www.inthecompanyofdogs.com/itemdy00.asp? c=&T1=D19083&GEN1=&SKW=fetch&PageNo=1, last visited Aug. 24, 2011.
Do You Look Like Your Dog? Board Game Information, available at http://boardgamegeek.com/boardgame/27907/do-you-look-like-your-dog, last visited Aug. 24, 2011.

*Primary Examiner* — Kurt Fernstrom
(74) *Attorney, Agent, or Firm* — Adam R. Stephenson, Ltd.

(57) ABSTRACT

An educational board game is designed to teach children how to care for a pet. The game includes a game board having a serpentine path which has a start and a finish and spaces for movement thereon. Game pieces are moved on the spaces between the start and the finish according to a random movement generator controlling the movement of the game pieces along the specified path. The spaces have specified actions when the game pieces land thereon.

7 Claims, 2 Drawing Sheets

U.S. PATENT DOCUMENTS

| | | |
|---|---|---|
| 2006/0012121 A1 | 1/2006 | Vance |
| 2006/0290051 A1 | 12/2006 | Normand |
| 2007/0013128 A1 | 1/2007 | Pastor |
| 2008/0197570 A1 | 8/2008 | Lewis et al. |
| 2009/0174142 A1 | 7/2009 | Sullivan |
| 2010/0081114 A1 | 4/2010 | Goodrich et al. |

* cited by examiner

PET THEME EDUCATIONAL BOARD GAME

CROSS REFERENCE TO RELATED APPLICATIONS

This application is a continuation application of the earlier U.S. Utility Patent Application to Patricia McCormick Moss entitled "Pet Theme Educational Board Game," application Ser. No. 12/267,892, filed Nov. 10, 2008, now pending, the disclosure of which is hereby incorporated entirely herein by reference.

BACKGROUND

1. Technical Field

This invention relates generally to the field of board games, and, more particularly, to a board game using a pet theme to teach about the care of pets such as dogs and cats.

2. Background Art

The ownership and care of pets such as dogs and cats are often a part of growing up for children and families. These pets need to be cared for properly to remain healthy and happy in the home. Thus, teaching children how to care for such pets is a very useful life skill for a child. Thus, there is a need for an educational method which assists in helping a child to learn these skills.

Board games are well known in the art. Famous games include MONOPOLY, CLUE and the like. Such board games have often been proposed for teaching or educating a player about various aspects of animal care. For example, U.S. Pat. No. 5,052,692 entitled "System for Teaching the Art of Animal Exhibition" which issued on Oct. 1, 1991 to Gustafson discloses a game which teaches a user how to exhibit animals in shows. U.S. Pat. No. 6,352,259 entitled "Pet Lover's Board Game" which issued to Israel on Mar. 5, 2002 discloses a MONOPOLY style pet lover board game. U.S. Pat. No. 5,897,115 entitled "Motivational Game for Pet/Dog Training" which issued on Apr. 27, 1999 to Sherry et al. discloses a pet obedience training board game.

However, none of the known prior art disclose the combination set forth herein.

SUMMARY

It is an object of this invention to provide an educational board game for families relating to pet care in general.

It is a further object of this invention to build awareness and knowledge in children for responsible pet ownership.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION

Figure 1:
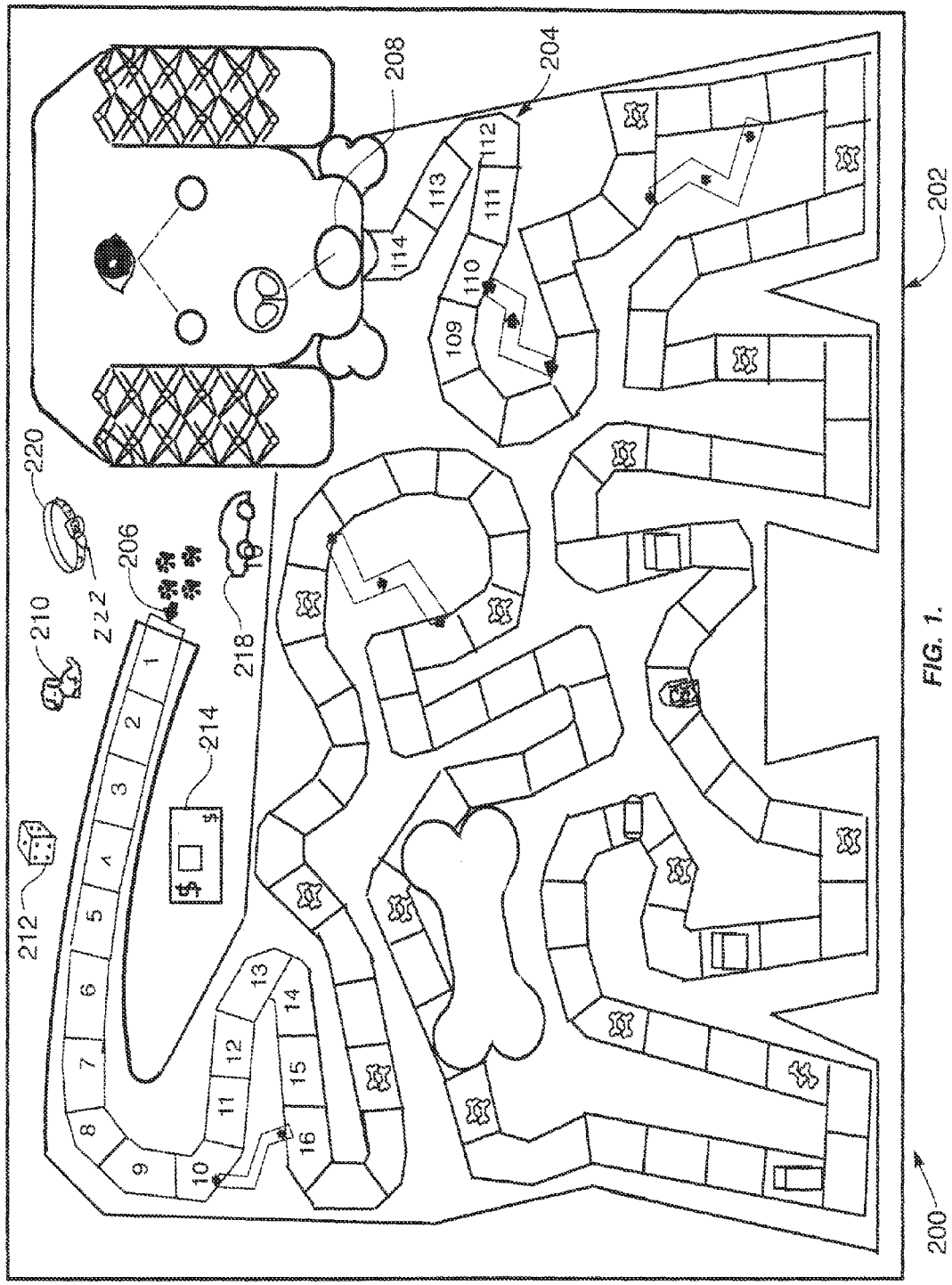
FIG. 1 is a top view of one embodiment of the present invention.
Figure 2:
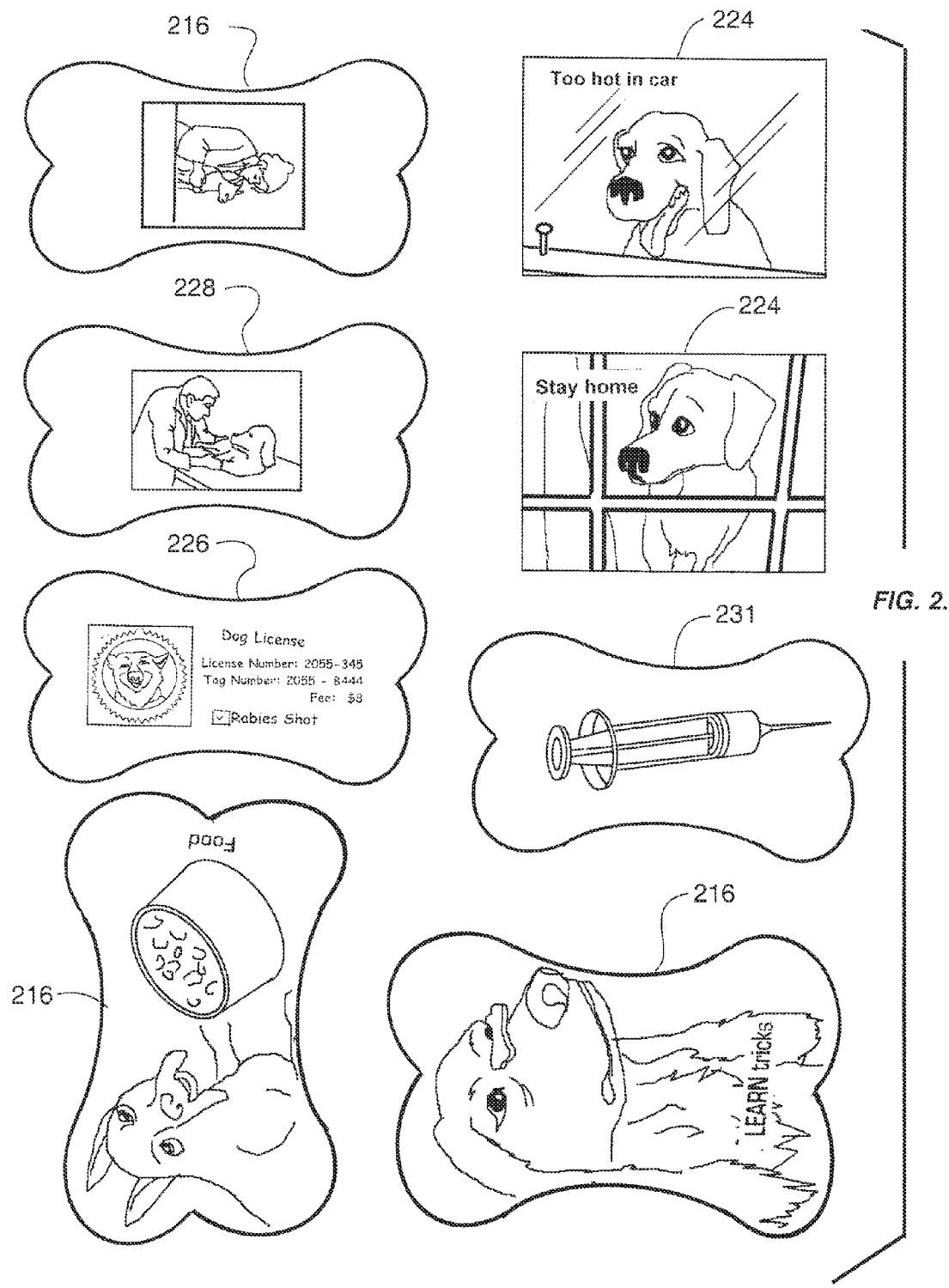
FIG. 2 is a top view of various cards and bones used in the invention of FIG. 1.

Referring more particularly to the drawings by characters of reference, FIGS. 1-2 disclose combinations of features which constitute the components of a board game 200 of the present invention. Educational board game 200 is designed to teach children how to care for a pet. The board game includes a game board 202 having a serpentine path 204 imprinted thereon, the serpentine path having a start 206 and a finish 208 and spaces 1-114 for movement thereon between the start and the finish.

One or more game pieces 210 movable on spaces 1-114 between start 206 and finish 208. A random movement generator 212 controls the movement of game pieces 210 along serpentine path 204. Spaces 1-114 have specified actions for a pet therefore and a specified consequence including rewards and monetary expenditures or acquisitions. Each of the spaces 1-114 direct the specified actions and consequences when the one or more game pieces 210 land on a particular space 1-114.

With more particularity, a set of problem cards 224 are also provided which depict pet problems and solutions. Problem cards 224 are selected when game piece 210 lands on a space 1-114 wherein the specified action is to take a problem card 224. Reward cards 216 which depict pet care actions are also available. Reward cards 216 are selected when game piece 210 lands on a space 1-114 wherein the specified action is to take a reward card 216. Reward cards 216 are lost when a problem card 224 is selected.

Additionally, game 200 includes play money 214 in predetermined denominations for taking care of pet problems, for example, paying a veterinarian bill or for licenses and tags.

The game 200 ends when all game pieces 210 reach finish 208, a winner being the game piece 210 with the most rewards 216. If one or more game pieces 210 have an equal number of rewards 216, the winner is the game piece 210 which reached finish 208 first.

In the particular embodiment example shown here, board game 200 includes board 202 having serpentine path 204 imprinted thereon. Serpentine path 204 includes the plurality of spaces, in the illustrated embodiment, spaces 1 to 114, extending sequentially along path 204 from start point 206 to an end point 208. In the illustrated embodiment, serpentine path 204 traces a stylized outline of a dog with start point 206 being the tip of the dog's tail and end point 208 being the dog's nose. The representation of the stylized dog is exemplary in nature and other shapes, for example, a cat, could be employed. Alternatively, serpentine path 204 does not need to represent anything. The game described herein relates to dogs. However, those skilled in the art will recognize that variations for cats or other pets are certainly contemplated within the scope of the present invention.

To summarize the game, two or more players have game pieces 210, in the exemplary embodiment depicting various breeds of dogs, which are moved according to a roll of dice 212. Depending upon space 1 to 114 landed on, the players receive or spend money 214 and obtain dog bones 216. Once all players have traversed game board 204, the player with the most bones 216 wins.

In the illustrated embodiment, board game 200 includes 8 dog pieces 210, 2 dice 212, 1 toy car 218, 8 collars 220 with tags 222 attached (four blue tags and four pink tags), 100 reward bones 216, 14 paw cards 224, 4 yellow license bone cards 226, 4 pink spay bone cards 228, 4 blue neuter bone cards 216, 4 orange shot bone cards 231, and play money 214. Each bone 216 pictures a dog in action and its needs, for example, health care, exercise, socialization, food, water, learning, playing, shelter, love, and fun. Each paw card depicts a pet problem along with its solution.

Game Rules

Each player starts with play money 214 totaling $200.00; 5 $20's, 6 $10's, 6 $5's and 10 $1's.

Each player rolls dice 212 with the highest number going first. Players select a dog game piece 210 which enters serpentine path 204 at tail 206. Unused game pieces 210 are considered to be in a dog shelter. The game begins at the tip of the tail 206.

Each player takes turns by throwing the dice, moving the dog the number of spaces shown on the dice and then following the directions on the space. The game ends when all players have crossed finish at the dog's nose 208. An exact number roll of the dice is not needed to finish. The game is won by finishing with the most bones 216. Winner gets to select another dog from the animal shelter (at the ears). The player who crosses finish line first collects the nose. If two or more players receive the same amount of bones and are tied, then the player who has the nose, wins the game, in accordance with the disclosure provided.

With regard to the board game 200, spaces 1 to 114 are denoted in the following manner in this example. Those skilled in the art will recognize that other configurations are possible:

START
1. Bone
2. Bone
3. Bone
4. Bone
5. Food pay $15
6. Bone
7. Bone
8. Pay $12 for collar & tag as you pass
9. School pay $12
10. Image of family walking dog, follow arrows
11. Bone
12. Back to school
13. Bone
14. Pick up poop
15. Biscuit pay $1
16. Bone
17. Bone
18. Whoops house train
19. Bone
20. Bone
21. Take car to get shots
22. Bone
23. Bone
24. Injury pay $35
25. Shots pay $30
26. Sick pay $35
27. Spay/Neuter pay $35
28. Bone
29. See neglected pet, tell someone, call for help
30. Back to vet, sick
31. Woofwear pay $10
32. Barkin Burger pay $10
33. Movie pay $10
34. Claws and paws pay $10
35. Bone
36. Rescue by SPCA
37. Bone
38. Bone
39. Food pay $15
40. Trainer pay $30
41. Bone
42. Take car to Yip Yap Park
43. Back to trainer
44. PAW draw card
45. Bone Yip Yap Dog Park
46. Bone
47. Brush pay $4
48. Bone Arf Arf Dog Park
49. Bone
50. Poop Pick it up
51. Leash pay $12
52. Entering Woofville—Leash Law—back to leash
53. Take car to library
54. Bone
55. Clean dog area earn $15
56. Library
57. Toy pay $4
58. Bone
59. Find and return lost dog, $20 reward
60. Foster puppies collect $20
61. Bone
62. Walk a dog earn $15
63. Food bowl pay $4
64. Bone
65. Free Clinic, spay/neuter and/or shot—collect bones you do NOT have
66. Bone
67. Give $10 to rescue group
68. Beauty contest win $15
69. Dog sitting earn $20
70. Take car to get a license
71. Bone
72. PAW draw card
73. Bone
74. License pay $8
75. Lost, found, adoption: if no tag, lose two bones
76. Shots pay $30
77. Spay/neuter Pay $35
78. Bone
79. Bone
80. Poop pick it up
81. Pet sitting earn $20
82. Bone
83. Back to poop YUCK!
84. Build dog house earn $20
85. Bone
86. Foster rescue dogs collect $20
87. Library
88. Bone
89. Dog walker earn $15
90. Bone
91. PAW draw card
92. Take car to contest
93. Bone
94. Frisbee contest win $15
95. Groomer pay $33
96. Bone
97. Back to groomer matted
98. Bone
99. See abuse of a pet, tell someone, call for help path
100. Bone
101. Volunteer
102. Rescue by Humane Society
103. Spay/neuter pay $35
104. Adoption—at Finish adopt a dog
105. Leaving Woofville bye
106. Image of muddy dog, follow path
107. PAW draw card
108. Take car to get toy
109. Image of dog on computer—Woof and me website 110. Bone
111. Toy pay $2
112. Responsible Owner—collect $30
113. Bone
114. Bone
FINISH In one variant, a six sided die 212 includes the numbers 1-5 while the sixth side shows a bone wherein showing a bone upon a die roll entitles the user to collect double bone cards 216.

Although only certain embodiments have been illustrated and described, it will be apparent to those skilled in the art that various changes and modifications may be made therein without departing from the spirit of the invention or from the scope of the appended claims.

The invention claimed is:

1. A method of playing a pet theme educational board game, comprising:
engaging a random movement generator to generate one of a number and a non-numeric indicator indicative of a treat of an animal, wherein the animal is illustrated on a game board;
moving a game piece a number of spaces, corresponding with a number generated by the random movement generator, along a path of the game board which starts at a tail of the animal, orients randomly within a torso of the animal, and ends proximate a head of the animal; and
acquiring a reward card displaying the treat of the animal in response to the random movement generator generating the non-numeric indicator.

2. The method of claim 1, further comprising passing the following spaces between a start and a finish: a space indicating a fee for pet food; a space indicating a fee for a collar and tag; a space indicating a fee for pet school; a space indicating a fee for a pet biscuit; a space indicating a fee for a pet injury; a space indicating a fee for a sick pet; a space indicating a fee for pet clothing; a space indicating a fee for a movie; a space indicating a fee for pet grooming; a space indicating a fee for pet training; a space indicating a fee for a pet brush; a space indicating a fee for a leash; a space indicating a fee for a toy; and a space indicating a fee for a food bowl.

3. The method of claim 1, further comprising losing one or more reward cards in response to drawing a problem card indicative of a pet-themed problem, wherein the problem card is drawn in response to the game piece landing on a space wherein the specified action is to take a problem card.

4. The method of claim 1, further comprising acquiring one of: a yellow license bone card; a pink spay bone card; a blue neuter bone card; and an orange shot bone card, upon landing on a corresponding space and paying a specified fee in play money.

5. The method of claim 1, further comprising engaging two random movement generators, wherein: when the random movement generators generate two non-numeric indicators, two reward cards are drawn and the game piece is not moved; when the random movement generators generate one non-numeric indicator and one number, the game piece is moved a number of spaces corresponding with the number and one reward card is drawn; and when the random movement generators generate two numbers, the game piece is moved a number of spaces corresponding with a sum of the two numbers and no reward cards are drawn unless a space landed on results in drawing a reward card.

6. The method of claim 1, wherein, before commencing movement of the game pieces at a start of the board game, any unused game pieces are placed at an animal shelter illustrated on the game board and, at a finish of the board game, a player who wins the board game removes one of the game pieces from the animal shelter.

7. The method of claim 1, further comprising moving the game piece within a plurality of about 180 degree turns within a plurality of limbs of the animal.

\* \* \* \* \*